United States Patent [19]
> Hackstein et al.

[11] 4,076,775
[45] Feb. 28, 1978

[54] BLOCK FUEL ELEMENTS FOR HIGH TEMPERATURE POWER REACTORS

[75] Inventors: Karl-Gerhard Hackstein, Hanau; Milan Hrovat, Rodenbach; Willi Wolff, Kahl, all of Germany

[73] Assignee: Nuken G.m.b.H., Hanau, Germany

[21] Appl. No.: 651,563

[22] Filed: Jan. 22, 1976

Related U.S. Application Data

[63] Continuation of Ser. No. 326,151, Jan. 23, 1973, abandoned, which is a continuation-in-part of Ser. No. 218,244, Jan. 17, 1972, abandoned.

[30] Foreign Application Priority Data

Feb. 15, 1972 Germany .............................. 2207011
Jan. 30, 1971 Germany .............................. 2104431

[51] Int. Cl.² ........................................... G21C 21/00
[52] U.S. Cl. ..................................... 264/0.5; 176/71
[58] Field of Search ...................... 176/71, 84; 264/.5

[56] References Cited

U.S. PATENT DOCUMENTS

| | | | |
|---|---|---|---|
| 3,011,960 | 12/1961 | Williams et al. | 176/71 X |
| 3,213,530 | 10/1965 | Wood et al. | 176/84 X |
| 3,220,926 | 11/1965 | Stoker | 176/84 X |
| 3,413,196 | 11/1968 | Fortescue et al. | 176/84 X |
| 3,676,297 | 11/1972 | Rennie et al. | 176/71 X |
| 3,773,867 | 11/1973 | Williams et al. | 176/84 X |
| 3,781,190 | 12/1973 | Rapier | 176/84 X |
| 3,793,144 | 2/1974 | Magladry et al. | 176/72 X |
| 3,975,471 | 8/1976 | Hrovat et al. | 264/.5 |
| 3,988,397 | 10/1976 | Hackstein et al. | 264/.5 |

*Primary Examiner*—Peter A. Nelson
*Attorney, Agent, or Firm*—Cushman, Darby & Cushman

[57] ABSTRACT

Block fuel elements are prepared according to application Ser. No. 218,244 of Jan. 17, 1972, and now abandoned, from isotropic graphite granulates and coated fuel particles solely by pressing and without any mechanical processing. The cooling channels are pressed directly along with the other parts of the fuel elements.

11 Claims, 4 Drawing Figures

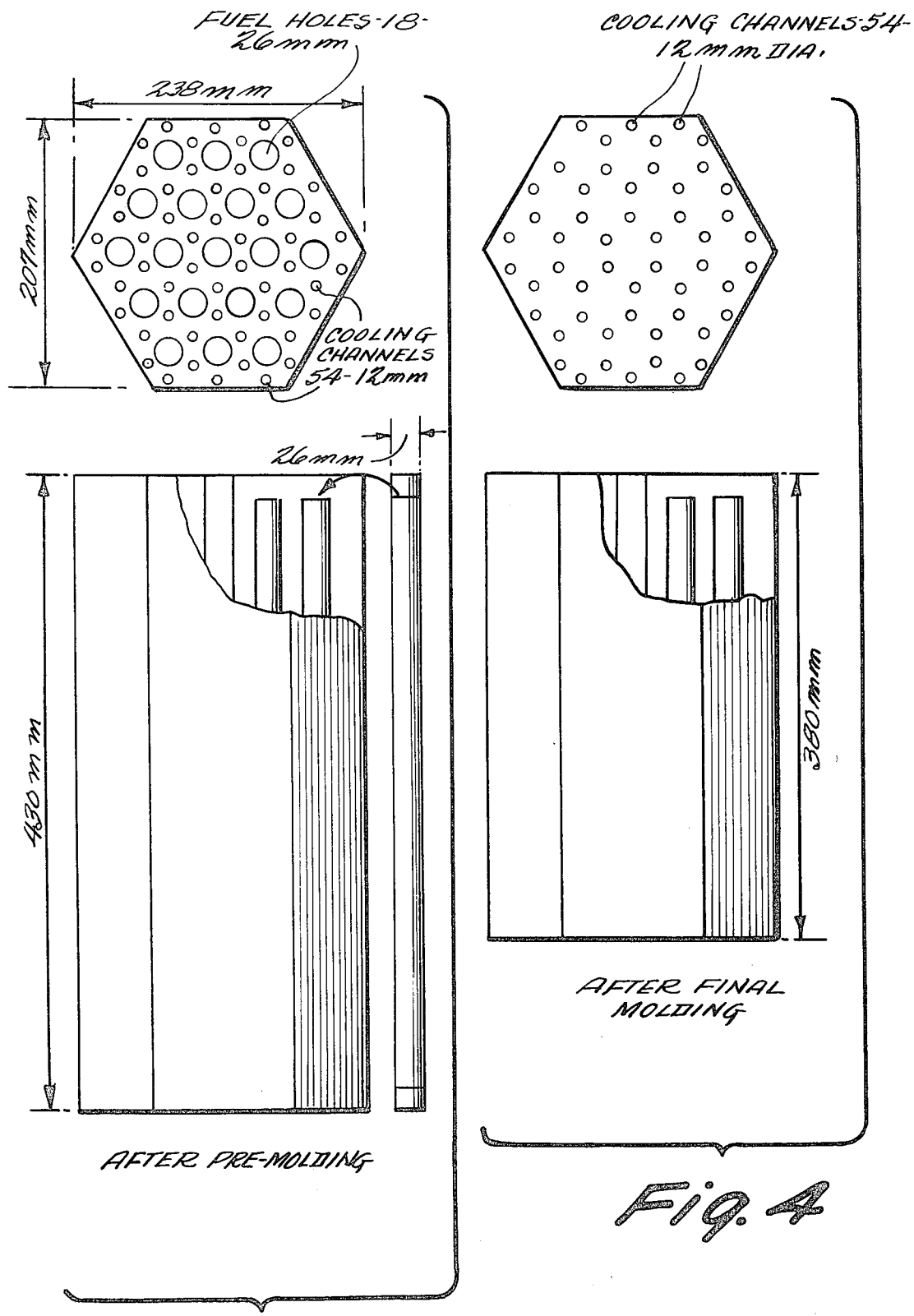

BLOCK FUEL ELEMENTS FOR HIGH TEMPERATURE POWER REACTORS

This is a continuation of application Ser. No. 326,151, filed Jan. 23, 1973, which is a continuation-in-part of application Ser. No. 218,244, filed Jan. 17, 1972, and both abandoned.

As stated in the parent case, in order to better utilize the fuel element volume it has previously been proposed to employ molded block fuel element in Hrovat application Ser. No. 3,284, filed Jan. 16, 1970 and now abandoned, corresponding to German application P 1902994.8. The molded block fuel element is a compact prism provided with cooling channels, which consist of only a homogeneous graphite matrix and coated fuel particles.

It is essential that the graphite matrix in which the coated particles are impressed simultaneously form the fuel element structure. Consequently in relation to the portion of fuel particles, a far greater fuel volume is available. Besides there is eliminated the heat flow barrier acting gap between the fuel zone and structural graphite. Additionally, at unchanged fuel element loading, the power density in the fuel zone is strongly reduced, the heat output considerably improved and correspondingly the temperature gradient and consequently the thermal and radiation induced stress greatly reduced. Moreover, the lower stress and the improved efficiency of the prism volume permits a several fold increase of the fuel and fertile material content in the fuel element, whereby the construction of the cooling channels (volume and surface area) can be adjusted without limitation of the sides of the fuel elements to the optimum cooling conditions. The increased fuel load considerably reduces the cost of producing the fuel element and simultaneously leads to higher powder density in the reactor core and also a lower capital cost, see R. C. Dahlberg "Comparison of HTGR Fuel Cycles for Large Reactors," Oak Ridge — Symposium April 1970, Paper No. 130, Session No. VI.

The possibility of laying out the cooling channels without limitation reduces the helium pressure drop in the reactor core and accordingly the necessary pumping power for the helium cycle, which again reduces the cost of the generation of current.

Besides the graphite matrix serves as moderator, heat conductor, secondary barrier for the fission products and protects the coated particles against a damaging corrosion by impurities which are present as traces in the helium cooling gas.

A series of requirements are placed on the graphite matrix.

1. Good irradiation behavior up to temperatures of 1400° (E>0, 1 MeV). This requirement assumes an as much as possible high crystallinity of the isotropic graphite matrix.
2. Good thermal conductivity and as low as possible coefficient of thermal expansion in order that entry of inadmissible thermal stresses in the block fuel element be avoided
3. Good strength properties.
4. Good corrosion resistance.

Furthermore, in the production there is required a nondestructive consolidation of the coated fuel particles into the graphite matrix.

The invention in the present application avoids the technological difficulties of the known processes and permits the production of a block fuel element of any size and shape satisfying all requirements.

Accordingly, to the invention in the parent application there is first produced from molding powder an isotropic graphite granulate of high density having a definite porosity and this isotropic granulate subsequently hot pressed together with coated fuel particles at lower pressure, for example only about 60 kg/cm$^2$, to form isotropic fuel elements. The molding powder for the production of granulates consists of a mixture of natural graphite and binder resin, synthetic graphite and binder resin, or a mixture of both types of graphite powder with binder resin. When a mixture of natural and synthetic graphite are employed, they can be used in any proportions, e.g. 1 to 99% of either by weight.

The isotropic graphite granulate produced in the first step has an apparent density between 1.5 g/cm$^3$ and 1.85 g/cm$^3$ and a porosity of 25 to 7.5% by volume. The molding pressure in the first step is usually 40 to 60 kg/cm$^2$. The temperature in the first step can be room temperature or can be up to 70° C.

In the second step the pressure can be from 50 to 100 kg/cm$^2$ and the temperature 120° to 180° C.

The binder resin employed, for example, can be phenolformaldehyde, with a softening point of about 100° C but phenolformaldehyde resins with other softening temperatures between 60° and 120° C or with other softening temperatures between 60° and 120° C or with addition of curing agents as for example hexamethylene tetramine other formaldehyde resins for example on xylol or cresol base or furfurylalcohol resins can be used.

The binder resin can be used in an amount of 10 to 30% of the graphite by weight.

For the production of the isotropic granulate according to the parent application invention in the first step, a fine graphite powder, e.g. about 20 microns in diameter, having a high crystallinity, is molded at high pressure with a binding agent additive, preferably phenolformaldehyde resin, in a rubber mold to isotropic spheres. Subsequently the spheres are ground to granules having an average grain diameter of about 1 mm. The degree of fineness of the starting powder is so chosen that on the average each granulate grain consists of several hundred thousand or even about 1,000,000 isotropically arranged graphite particles. For the production of the molding powder any graphite, independent of particle form is suited, for example, natural graphite powder, synthetic graphite powder or a mixture of the two. In the second step the coated fuel particles in a rotating drum are overcoated with a molding powder of the same composition according to a kind of dragee process. These overcoated particles are mixed with the isotropic granules and the mixture hot pressed to the block in the plastic range of the binder resin. The temperature of the molding depends on the softening point of the resin. If a phenol formaldehyde resin is used, this temperature is about 130° C. To carbonize the binder, the pellets are heated in an inert atmosphere to 800° C. In this heat-treatment, the graphite is purified and freed of hydrogen. Besides the binder carbon is converted from an unoriented into a highly oriented carbon structure. As a result the resistance to oxidation and the heat conductivity of the matrix primarily are considerably improved.

As coated fuel particles there can be employed oxides or carbides of U 235, U 233 and fissionable plutonium isotropes as fuel materials in mixture with U 238 and/or Th 232 as fertile materials coated with multiple layers of pyrolytic carbon prepared in conventional manner. Conventional intermediate layers for example of SiC, ZrC or NbC can also be present in the coated fuel particles. The intermediate layers can be omitted.

To further explain the invention of the parent case, there are set forth several examples.

Unless otherwise indicated, all parts and percentages are by weight.

EXAMPLE 1

The Production of A Cylinder Of Isotropic Granulate Without Fuel

A molding powder was produced from a mixture of 60 weight % natural graphite powder "FP," 20 weight % graphitized petroleum coke powder and 20 weight % of "1949 resin binder" dissolved as a 40% solution in methanol by kneading, drying and grinding. The FP powder is a nuclear pure natural graphite having an ash content of 200 ppm., an average particle diameter of 20 microns and a high crystallinity (crystal size $Lc = 1000A$). The graphitized petroleum coke is a needle coke graphitized at 3000° C. having an extremely low ash content (ash less than 10 ppm), an average particle diameter of 20 microns and a crystal size $Lc$ of 500 A. The 1949 binder is a phenol formaldehyde resin having a high degree of condensation (softening point of 100° C., molecular weight 700), which remains stable without change in properties while molding at 150° C.

Spheres having a diameter of 62 mm. and a density of 1.9 g/cm$^3$ were prepared by molding the molding powder in rubber molds at room temperature and a pressure of 3 t/cm$^2$ ($t$ being metric tons). In site of the platelet shaped particles of the natural graphite powder, the molding in the rubber molds permitted the formation of an isotropic consolidation. The anisotropic factor of the thermal expansion measured on the spheres was only $a\perp/a11 = 1.1$.

The isotropic granules used having a particle diameter of $3.15 > d > 0.315$ mm were obtained by comminuting the graphite spheres and subsequently sieving. Cylinders were molded from the isotropic granules at 150° C. in steel dies. At a green density of 1.8 g/cm$^2$ the required molding pressure was only 60 kg/cm$^2$. The pellets were carbonized in an inert gas stream and finally calcined in a vacuum at 1800° C.

The following table sets forth the properties of the matrices produced from isotropic granules and from molding powder.

Table

| Graphite Matrix | From Isotropic Granules | From Molding Powder |
|---|---|---|
| Bulk Density (g/cm$^3$) | 1.76 | 1.65 |
| Specific electric resistance (Ohm × cm) × 10$^{-3}$ | ∥ 1.39 ⊥ 1.97 | 1.18 3.40 |
| Ultimate Flexural Strength (kg/cm$^2$) | ∥ 160 ⊥ 120 | 300 150 |
| Thermal conductivity at 20° X.(cal/cm sec. ° C.) | ∥ 0.16 ⊥ 0.13 | 0.18 0.07 |
| Linear thermal expansion (10$^{-6}$/° C.) | ∥ 2.15 ⊥ 3.21 | 1.6 5.6 |
| Anisotropic factor of the thermal expansion | 1.49 | 3.5 |

∥ = parallel to the grain orientation
⊥ = right angle to the grain orientation

The table clearly shows that according to the invention all properties of the graphite matrix in regard to isotropy are improved considerably. This follows most clearly from the anisotropic factor which is reduced from 3.5 to 1.49. Therewith the invention even permits the molding of quasi isotropic and homogeneous cylinders from a natural graphite powder having the advantage of high crystallinity with extremely unfavorable platelet shaped grains.

EXAMPLE 2

The Production of Block Elements

The isotropic granules were produced as in example 1. In the comminution of the spheres and the subsequent sieving about 30 weight % were below the desired particle size ($d < 0.31$ mm), which were returned to the molding powder and the mixture again molded to spheres. A cylinder having a diameter of 240 mm and a height of 450 mm was preliminary molded from the isotropic granulate at 70° C. and a pressure of about 30 kg/cm$^2$. There were pressed into the inside of the cylinder parallel to the longitudinal axis in a hexagonal arrangement 19 metal tubes having diameters of 25 mm. After the removal of 18 tubes, there were obtained channels for the admission of fuel. The fuel particles used were uranium-thorium oxide nuclei having a diameter of 500 microns which were coated with pyrolytic carbon and an intermediate coating of silicon carbide.

The coated particles were encased with the molding powder in a rotating drum according to a kind of dragee process that their weight rose by a factor of 1.8. From the encased fuel particles there were preliminarily molded at about 70° C. and 30 kg/cm$^2$ cylinders having a diameter of 25.5 mm. After filling of the 18 channels with fuel cylinders, the entire block was heated to about 150° C. and finally molded at a pressure of about 60 kg/cm$^2$. After the molding, the matrix density was 1.8 g/m$^3$ at a 35% volume fraction of the coated particles in the fuel zone. Subsequently for the purpose of simplicity, there were bored 54 cooling channels in a hexagonal arrangement around the fuel columns.

To further illustrate the invention there are provided drawings wherein

Figure 1:
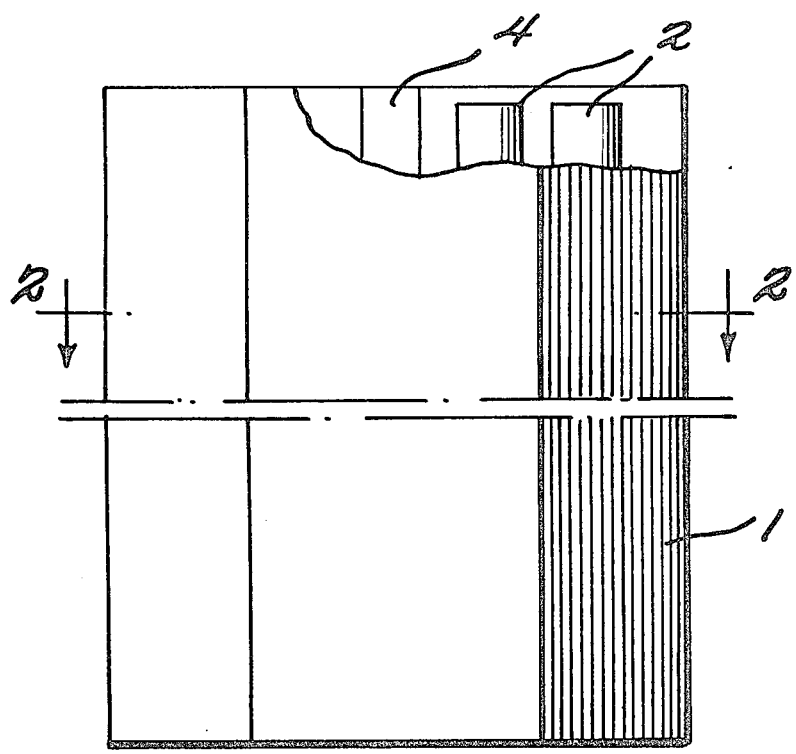
FIG. 1 is a vertical view partially broken away of a block fuel element.
Figure 2:
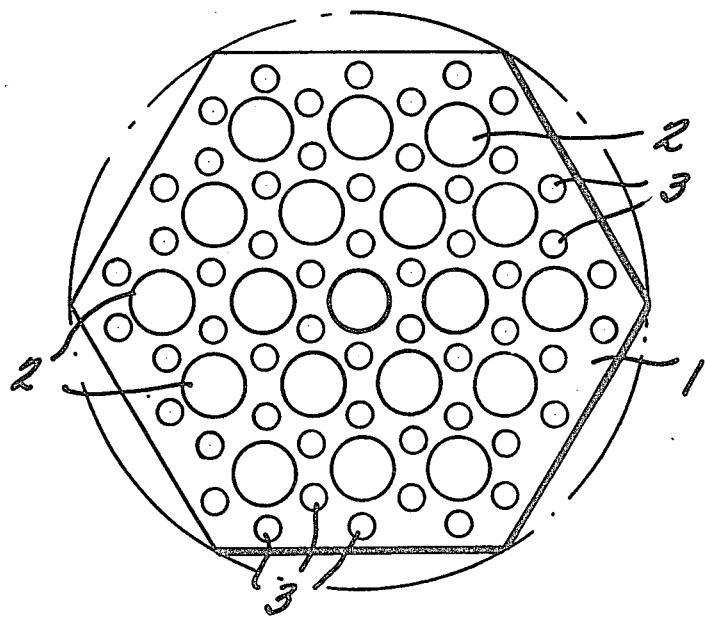
FIG. 2 is a sectional view taken along the line 2—2 of FIG. 1.

Referring more specifically to the drawings the block fuel element 1 consists of a hexagonal prism made from graphite which contains the 18 fuel zones 2 made of a mixture of graphite and coated particles. Furthermore, there are provided 54 cooling channels 3 and a central loading channel 4.

The cooling channels can be molded simultaneously with the molding of the block fuel element in order to avoid an inadmissible pressure build up of the cracking products inside the block in the carbonization. For this purpose, corresponding metal rods are pressed in and are then removed after the molding. To carbonize the binder the fuel element is calcined in a nitrogen stream up to 800° C. To balance the dimensional changes of the fuel containing zones with the fuel free zones during the carbonization, there the degree of condensation of the phenol formaldehyde resin used for encasing is increased. This is obtained by the addition of small amounts of hexamethylene tetramine to the binder resin.

EXAMPLE 3

Production of Block Elements With Special Binder Pretreatment

The fabrication of the isotropic graphite granules and the preliminary pressing of the block were carried out in the same manner as described in examples 1 and 2 respectively. The graphite matrix powder prepared to overcoated fuel particles was a mixture of 60 weight % natural graphite powder. Grade FP, 20 weight % of phenol formaldehyde resin, so for the same mixture as used for fabricating the granulate. However, the resin used for overcoating contained 2 weight % of hexamethylene tetramine as curing agent which in the heating step following after pressing at first leads to a large condensation of this resin and later on to a balanced carbonization shrinkage of the fuel body compared with the surrounding block matrix.

Parallel thereto, under the same production condition, molded cylinders with a particle load in the fuel zone of 35 volume % were, after final heat treatment, tested for damaged fuel particles. The graphite matrix of the samples was decomposed electrolytically (anode oxidation) and the electrolyte (dilute nitric acid) tested for free uranium. The total amount of uranium found amounted to 13 micrograms. This corresponds to only a third of the amount of uranium of a fuel particle. The result clearly shows that in production according to the invention of the parent case, the coated particles remain completely uninjured. Exceeding the above described proceedings of the parent invention Ser. No. 218,244 in the following there are explained the additional processes of this supplementary invention.

As is known, block fuel elements for high temperature power reactors are produced by providing prefabricated, mostly hexagonal electrolytic graphite blocks with bores, into which subsequently cylindrical fuel compacts are inserted loosely.

The fuel compacts consist of coated fuel particles embedded in a graphite matrix frame, which contains graphite and binder coke and is formed by the use of a graphite powder-binder resin mixture during pressing of the fuel-compacts and the subsequent heat treatment. In every case, the graphite characteristics of the block graphite and those of the compact graphite matrix are different.

The disadvantages of the fuel elements that have become known hitherto are:
1. Processing of electrolytic graphite. The manufacture of prisms with bores is connected with high processing costs and with a loss of graphite up to 50%.
2. Poor utilization of the volume of the fuel element, of which about 60% are for the block structural graphite and 20% for the cooling channels. Only about 20% of the total volume are thus available for the reception of the fuel compacts. An increased drilling is not possible because of weakening the strength of the block.
3. Heat impeding gaps between the fuel-compact and the block graphite which lead to undesirably high fuel temperatures. A consequence of that is the limited power density in the reactor core.
4. An uncertain irradiation behavior. The block graphite differs from the graphite matrix of the fuel-compact in regard to crystallinity, isotropy and degree of graphitization. Consequently the two components behave differently during irradiation with high speed neutrons. This different behavior leads to an enlargement of the heat curbing gaps. Thus, stresses in the fuel element induced thermally and by irradiation are increased and the rate of setting free the fissin products is enlarged because of a higher fuel temperature.

The present invention is directed to improving the object of parent application Ser. No. 218,244 by introducing the cooling channels into the block element during the pressing process itself without any kind of mechanical processing.

The process of the invention is applicable to block fuel elements both with homogeneous and heterogeneous fuel arrangement. The invention signifies a substantial progress as compared to the hitherto known state of the prior art.

Essential characteristics of the fuel element according to the invention consist in the fuel being present in geometrically defined cylindrical zones in the heterogeneous fuel charge. This zone in every instance is surrounded by cooling channels which are pressed in directly with the others during production. Furthermore, the coated fuel particles are distributed homogeneously in the entire block graphite matrix, so that only the walls of the cooling channel as well as the walls of the surface at a depth of 2 to 10 mm are free of fuel, and the cooling channels are pressed directly along with the others during production. The pressing is accomplished with a pressing tool which allows the pressing of the element with the cooling channel arrangement directly to the required dimensions without mechanical processing.

The following two examples explain the object of the invention.

EXAMPLE 4

The Production of a Block Fuel Element with Heterogeneous Fuel Distribution and Impressed Coolant Channels The isotropic granulate was produced as in example 1. The granulate was used to fabricate in a first process step a hexagonal prism as shown in FIG. 3, molding at a pressure of 40 kg/cm$^2$ and at a temperature of 70° C. The holes for inserting the fuel and the coolant channels were impressed into the prism during this first molding step. A density of 1.4 g/cm$^3$ was obtained in this pre-molding step. FIG. 3 is the cross and axial cut of the pre-molded hexagonal prism presenting the impressed holes for inserting the fuel, for handling, and for cooling. The molding tool used in the experiment was described in the German application P 22 05 018.6 "Process for the fabrication of molded block fuel elements of high power for gas-cooled high temperature reactors" (U.S. Ser. No. 277,103, filed August 1, 1972, now U.S. Pat. No. 3,836,311). The molding tool used for the pre-molding and the final molding step in this experiment consisted of a heated steel matrix, upper die, lower die and inner dies. The upper and lower die plates were provided with holes through which the ends of the inner dies protruded during molding.

For pre-molding 19 inner dies for the fuel channels and for the central channel for handling and 54 inner dies for the coolant channels were inserted, in the arrangement shown in FIG. 3. The inner dies arranged free movable in axial direction were held by friction in the molding material during pressing the upper and lower dies together in the floating steel matrix. Then the coated fuel particles were overcoated with the same graphite molding powder as used for producing the granulate (example 1). These overcoated particles were pre-molded to cylinders of 26 mm diameter, using a pressure of 35 kg/cm² and a temperature of 70° C. These pre-molded cylinders were inserted into the 18 holes of the pre-molded prism. The fuel particles used were uranium/thorium oxide kernels threefold coated with pyrolytic carbon. The uranium/thorium atomic ratio was 1 : 10. The kernels had a diameter of 420 μm. The coating thickness of the three layers was 190 μm, the coated particles had a heavy metal content of 50% weight fraction.

The finally assembled prism was set into the molding tool, thereby inserting 54 inner dies into the coolant channels. In the second molding step, the prism was densified in axial direction at 150° C and at 60 kg/cm² to the final dimensions. After ejection and after extraction of the inner dies the prism was heat-treated at 1800° C. FIG. 4 shows the complete block fuel element in cross and axial cut.

The Properties of the block fuel elements produced in such way are shown in the following table:

| 1. | Dimensions | | |
|---|---|---|---|
| | Outer diameter (average) in mm: | | |
| | above | : 206.6 | |
| | middle | : 207.0 | |
| | down | : 206.7 | |
| | Height (mm) | : | 380 ± 0.5 |
| | Diameter of coolant channels (mm) : | | 12 ± 0.03 |
| | Volume ratio of cooled fuel particles in the fuel zones: | | 30% |

| 2. | Physical properties of the graphit matrix, measured in the fuel free zone: | | | |
|---|---|---|---|---|
| | Bulk density | (g/cm³) | | 1.74 |
| | Thermal conductivity | (cal/cm sec ° C) | ‖ | 0.08 |
| | | | ⊥ | 0.08 |
| | Youngs modulus | (kg/cm²) | ‖ | 6.9 10⁴ |
| | | | ⊥ | 4.0 10⁴ |
| | Tensile strength | (kg/cm²) | ‖ | 58 |
| | | | ⊥ | 54 |
| | CTE Coefficient of thermal expansion at 20 – 500° C | (1/° C × 10⁻⁶) | ‖ | 3.1 |
| | | | ⊥ | 4.1 |
| | Anisotropic factor of CTE | | | 1.3 |

( ‖ parallel to grain, ⊥ perpendicular to grain)

EXAMPLE 5

The Production of a Block Fuel Element of Homogeneous Fuel Arrangement with Impressed Coolant Channels The isotropic granulate was produced as in example 1. In the first step the coated fuel particles were overcoated as in example 4 with the same graphite molding powder as used for producing the isotropic granulate, then these overcoated particles were mixed with further graphite molding powder in a weight ratio of 1 : 1, and this mixture was pre-molded in a molding tool similar to that used in example 4 at 40 kg/cm² and 70° C to obtain a hexagonal prism with 54 enlarged coolant channels (diameter 22 mm).

The sides of the coolant channels and the surfaces of the pre-molded block were provided with a fuel-free layer of about 5mm thickness which was pre-molded of the isotropic granulate (tubes and plates). After inserting 54 inner dies of 12 mm diameter into the coolant channels, the prism was molded in the second step in the molding tool at 60 kg/cm² and 150° C and then heat-treated at 1800° C.

The properties of the block fuel elements produced in such manner are nearly identical to those shown in example 4 for the heterogeneous fuel elements.

The pressure at the final molding step is influenced by the body height and the type of binder and is between 50 and 300 kg/cm², preferentially between 60 and 150 kg/cm².

What is claimed is:

1. A process for the production of a block fuel element with parallel cooling channels having an isotropic structure and useful for gas cooled high temperature reactors consisting of preparing isotropic granulates by molding resin containing graphite molding powder by an isotropical consolidation process to obtain a molded product with isotropic properties, comminuting and sieving said product to form said isotropic granulates, compression molding said isotropic granulates into a block containing parallel fuel channels and coolant channels, inserting into said fuel channels premolded fuel compacts made of fuel particles coated with resin containing graphite molding powder completing the molding of the block fuel element by compressing said block containing said fuel compacts at a pressure not over 300 kg/cm² and cooling channels to final dimensions and thereafter carbonizing the resin binder and heat-treating the molded block, the sole mechanical processing steps in said process being the said steps of molding, grinding and sieving the isotropic granulate and the steps of molding the block with cooling channels and fuel channels therein and of compressing the block shaped element from the molded block containing the fuel compacts and cooling channels.

2. A block fuel element prepared by the process of claim 1.

3. A block fuel element according to claim 2 wherein the fuel in the fuel charge is arranged heterogeneously in geometrically cylindrical zones, said zones being surrounded in each case by cooling channels.

4. A block fuel element according to claim 3 wherein the coated fuel particles are distributed homogeneously throughout the entire block graphite matrix and only the walls of cooling channel and walls of the surface are free of fuel at a depth of 2 to 10 mm.

5. A process according to claim 1 wherein the compressing of the block shaped element is carried out at 50 to 300 kg/cm².

6. A process according to claim 1 wherein said isotropic graphite granulates have a density of 1.5 to 1.9 g/cm³ with a porosity of 7.5 to 25% by volume and wherein said granulates have an average particle diameter of about 1 mm and each granulate particle contains several hundred thousand isotropically arranged graphite particles, said granulates having been prepared by molding resin containing graphite molding powder having an average grain diameter of about 20 microns, the molding powder consisting essentially of a mixture of (A) a binder resin with (B) a member of the group consisting of (1) natural graphite grains, (2) synthetic graphite grains, and (3) a mixture of both natural and synthetic graphite grains.

7. A process according to claim 6 wherein the carbonizing and heat treatment is at 1800° C.

8. A process according to claim 1 wherein the fuel particles are selected from the group consisting of the oxides and carbides of U 235, U 233 and fissionable plutonium isotopes.

9. A process according to claim 8 wherein the fuel particles are mixed with fertile material particles selected from the group consisting of the oxides and carbides of U 238 and Th 232.

10. A process according to claim 9 wherein there are employed as the fuel particles uranium oxide particles and as the fertile material particles thorium oxide particles.

11. A process according to claim 8 wherein the compressing of the block shaped element is carried out at 50 to 300 kg/cm$^2$.

* * * * *